United States Patent
Frayer et al.

(10) Patent No.: US 9,914,404 B2
(45) Date of Patent: Mar. 13, 2018

(54) VEHICLE COMPONENTS HAVING DEEP MESH PLATED FEATURES

(71) Applicant: SRG Global Inc., Warren, MI (US)

(72) Inventors: Rob Frayer, Huntington Woods, MI (US); Marlon Anderson, Howell, MI (US); Bill Michael Doroghazi, Livonia, MI (US)

(73) Assignee: SRG GLOBAL INC., Troy, MI (US)

( * ) Notice: Subject to any disclaimer, the term of this patent is extended or adjusted under 35 U.S.C. 154(b) by 0 days.

(21) Appl. No.: 15/230,577

(22) Filed: Aug. 8, 2016

(65) Prior Publication Data
US 2018/0037173 A1    Feb. 8, 2018

(51) Int. Cl.
| | |
|---|---|
| *B60R 13/00* | (2006.01) |
| *B29C 45/00* | (2006.01) |
| *B29C 45/02* | (2006.01) |
| *C25D 3/04* | (2006.01) |
| *C25D 5/02* | (2006.01) |

(Continued)

(52) U.S. Cl.
CPC .......... *B60R 13/00* (2013.01); *B29C 45/0003* (2013.01); *B29C 45/0053* (2013.01); *B29C 45/02* (2013.01); *C25D 3/04* (2013.01); *C25D 5/02* (2013.01); *C25D 5/56* (2013.01); *B29C 2045/0079* (2013.01); *B29K 2055/02* (2013.01);

(Continued)

(58) Field of Classification Search
CPC ....... B60R 13/00; B60R 13/005; B60R 13/04; B60R 19/52; B60R 2019/525; B29C 45/0003; B29C 45/0053; B29C 45/02; B29C 2045/0079; B29K 2055/02; B29K 2069/00; B29L 2031/30; C25D 3/04; C25D 5/04; C25D 5/56

USPC ....................... 296/193.1, 198.208
See application file for complete search history.

(56) References Cited

U.S. PATENT DOCUMENTS

| | | |
|---|---|---|
| 3,591,352 A | 7/1971 | Kennedy et al. |
| 3,640,789 A | 2/1972 | Hepfer |

(Continued)

FOREIGN PATENT DOCUMENTS

| | | |
|---|---|---|
| EP | 0132485 A1 | 2/1985 |
| JP | S59184228 A | 10/1984 |

(Continued)

OTHER PUBLICATIONS

PCT International Search Report and Written Opinion dated Oct. 4, 2017 for PCT International Application No. PCT/US2017/043602, 10 pages.

*Primary Examiner* — Gregory A Blankenship
(74) *Attorney, Agent, or Firm* — RMCK Law Group, PLC

(57) ABSTRACT

A method of manufacturing a chrome plated component can include performing a two-shot (2K) molding process to form a component comprising first and second \members. A non-plateable resin can be molded to form the first member defining a front surface that defines a recess. A plateable resin can be molded to form the second member defining a back surface that defines the protrusion. The component can then be removed from its mold, where (i) an exposed surface of the second member defines a front surface of the component and (ii) the recess receives the protrusion such that the front surface of the first member is substantially flush with the back surface of the second member. An exposed surface of the second member can then be chrome plated to obtain the chrome plated component.

20 Claims, 4 Drawing Sheets

(51) Int. Cl.
 *C25D 5/56* (2006.01)
 *B29K 69/00* (2006.01)
 *B29K 55/02* (2006.01)
 *B29L 31/30* (2006.01)

(52) U.S. Cl.
 CPC ....... *B29K 2069/00* (2013.01); *B29L 2031/30* (2013.01)

(56) References Cited

U.S. PATENT DOCUMENTS

| | | | | |
|---|---|---|---|---|
| 4,431,711 | A | * | 2/1984 | Eisfeller ............... B05D 5/068 427/250 |
| 5,441,626 | A | * | 8/1995 | Ogisu .................... B60R 19/52 205/118 |
| 5,630,928 | A | * | 5/1997 | Ogisu .................... B05D 1/322 205/118 |
| 6,027,150 | A | * | 2/2000 | Flewitt .................. B60K 11/08 180/68.6 |
| 6,673,227 | B2 | | 1/2004 | Boone |
| D497,860 | S | * | 11/2004 | Hoelzel ........................ D12/196 |
| 8,207,261 | B2 | | 6/2012 | Elia et al. |
| 9,290,124 | B2 | | 3/2016 | Pfeil et al. |
| 2005/0006928 | A1 | * | 1/2005 | Diehl .................... B60R 19/52 296/193.1 |
| 2005/0120537 | A1 | * | 6/2005 | Rester ................... B60R 19/52 29/453 |
| 2006/0119115 | A1 | * | 6/2006 | Filip ...................... B60R 19/52 293/115 |
| 2009/0117398 | A1 | | 5/2009 | Helmstetter et al. |
| 2009/0239079 | A1 | | 9/2009 | Wojtaszek et al. |
| 2010/0015434 | A1 | * | 1/2010 | Iwata .................. C08G 18/6216 428/327 |
| 2012/0156443 | A1 | | 6/2012 | Reeder |
| 2012/0225255 | A1 | | 9/2012 | Reeder |
| 2012/0235436 | A1 | | 9/2012 | Sun |
| 2013/0027252 | A1 | | 1/2013 | Lin |
| 2013/0196089 | A1 | * | 8/2013 | Ostrander ............. B60R 13/005 428/31 |
| 2015/0076851 | A1 | * | 3/2015 | Sugiura ................ B60R 13/005 296/1.08 |
| 2017/0002477 | A1 | * | 1/2017 | Yoshizawa ............... C25D 3/30 |
| 2017/0008473 | A1 | * | 1/2017 | Walters .................. B60R 19/52 |
| 2017/0080794 | A1 | * | 3/2017 | Yamamoto ............. B60K 11/04 |
| 2017/0137954 | A1 | * | 5/2017 | Hashimoto ............ B60K 11/08 |

FOREIGN PATENT DOCUMENTS

| | | |
|---|---|---|
| JP | 2008290295 A | 12/2008 |
| JP | 2015064287 A | 4/2015 |
| KR | 20120115993 A | 10/2012 |
| WO | 2005021231 A2 | 3/2005 |

\* cited by examiner

FIG. 2A
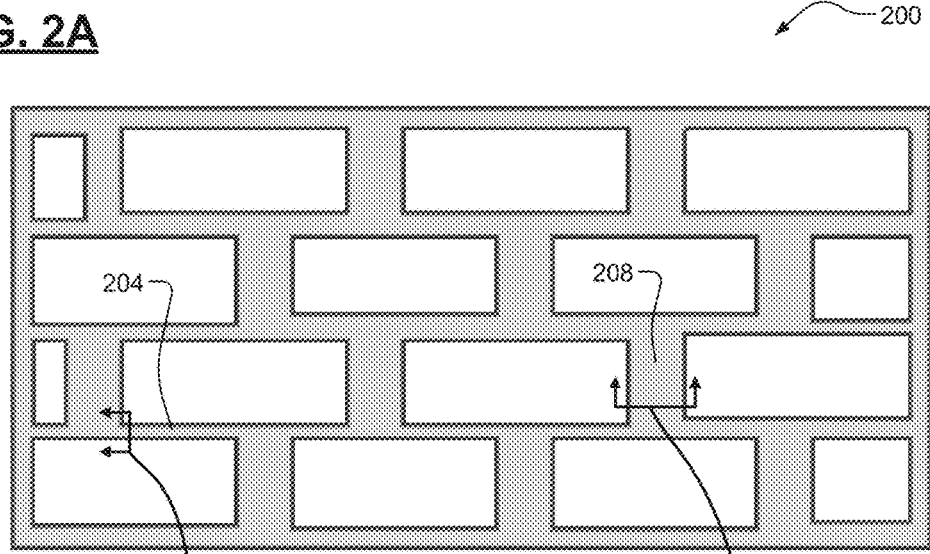
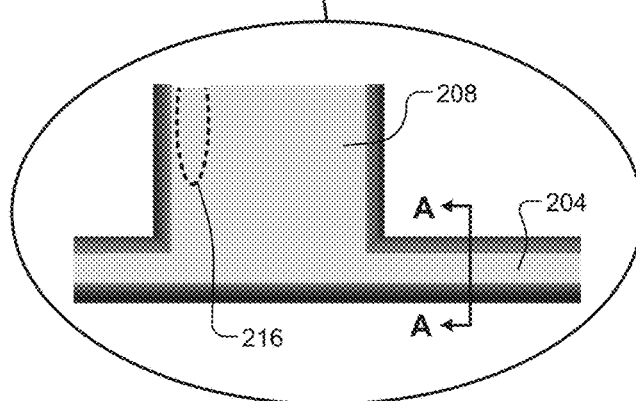
FIG. 2B
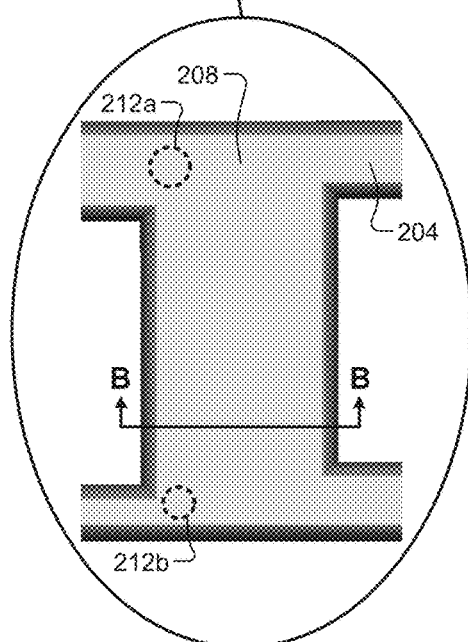
FIG. 2C

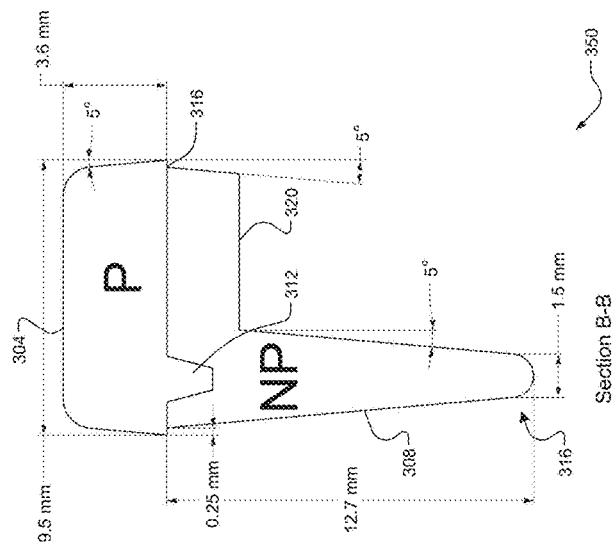
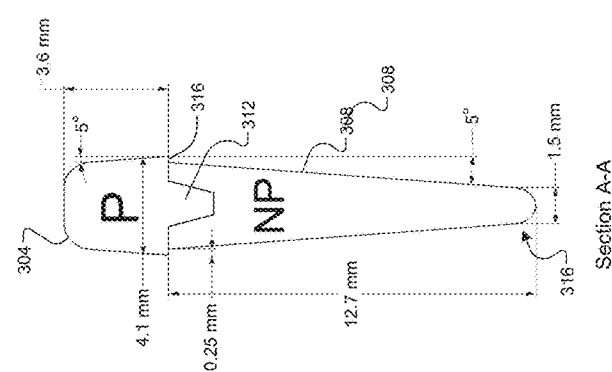

VEHICLE COMPONENTS HAVING DEEP MESH PLATED FEATURES

FIELD

The present application generally relates to chrome plating and, more particularly, to vehicle components having deep mesh chrome plated features.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Chrome plating is an electroplating technique where a layer of chromium is plated onto an object. For vehicle applications, plastic components are often chrome plated. In addition to providing functional benefits (corrosion and damage resistance, ease of cleaning, etc.), chrome plating can be used for aesthetic purposes. Achieving certain designs, such as deep mesh chrome plated features, can be difficult because cosmetic defects (e.g., sink marks) can occur due to the large mass at mesh intersections, as well because of non-plateable material depth limitations due to tooling requirements (draft, minimum thickness, etc.).

SUMMARY

According to one aspect of the present disclosure, a method of manufacturing a chrome plated exterior component for a vehicle is presented. In one exemplary embodiment, the method can comprise performing a two-shot (2K) molding process to form a component comprising (i) first and second or (ii) third and fourth members, the 2K molding process comprising: performing a first shot by molding one of: (a) a non-plateable resin in a mold to form one of (i) the first member, the first member defining a front surface that defines a recess, and (ii) the third member, the third member defining a front surface that defines a protrusion corresponding to the recess; and (b) a plateable resin in the mold to form one of (i) the second member, the second member defining a back surface that defines the protrusion, and (ii) the fourth member, the fourth member defining a back surface that defines the recess; after performing the first shot, performing a second shot by molding the other of the non-plateable and plateable resins in the mold to form the other of (i) the first and second members or (ii) the third and fourth members; and after performing the first and second shots, removing the component from the mold, where (i) an exposed surface of the second or fourth member defines a front surface of the component and (ii) the recess receives the protrusion such that the front surface of the first or third member is substantially flush with the back surface of the second or fourth member; and performing a chrome plating process to chrome plate the exposed surface of the second or fourth member to obtain the chrome plated component.

In some implementations, the method further comprises prior to molding (i) the first and second or (ii) third and fourth members, determining volumes of the recess and the protrusion based on a desired maximum depth of the first or third member. In some implementations, the first or third member defines a variable depth, and the volumes of the recess and the protrusion are proportional to the maximum depth of the first or third member such that a larger recess and a larger protrusion correspond to a greater maximum depth of the first or third member. In some implementations, the recess is aligned with a portion of the first or third member that defines its maximum depth.

In some implementations, draft angles of the recess and the protrusion correspond to a draft angle of the second or third member. In some implementations, the non-plateable resin is polycarbonate. In some implementations, the plateable resin is acrylonitrile butadiene styrene (ABS) or polycarbonate-ABS. In some implementations, the chrome plated component is a portion of a radiator grille. In some implementations, the chrome plated component is a fender vent.

According to another aspect of the present disclosure, a chrome plated component for a vehicle is presented. In one exemplary implementation, the chrome plated component can comprise: one of: (a) a first member formed of a non-plateable resin and defining a front surface that defines a recess and a second member formed of a plateable resin and defining a back surface that defines a protrusion corresponding to the recess, wherein the recess receives the protrusion such that the front surface of the first member is substantially flush with the back surface of the second member; and (b) a third member formed of the non-plateable resin and defining a front surface that defines the protrusion and a fourth member formed of the plateable resin and defining a back surface that defines the recess, wherein the recess receives the protrusion such that the front surface of the third member is substantially flush with the back surface of the fourth member; and a chrome plating on an exposed surface of the second or fourth member, wherein the chrome plated exposed surface of the second or fourth member defines a front surface of the chrome plated component.

In some implementations, a draft of the recess corresponds to a draft of the second or fourth member. In some implementations, the second or fourth member defines a variable depth, and wherein the recess is laterally aligned with a portion of the second or fourth member that defines its maximum depth. In some implementations, the first member defines a maximum depth less than or equal to 3.6 millimeters. In some implementations, the second member defines a maximum depth of greater than 12.7 millimeters. In some implementations, the second member defines a maximum depth of approximately 20 millimeters.

In some implementations, the non-plateable resin is polycarbonate. In some implementations, the plateable resin is ABS or polycarbonate-ABS. In some implementations, the chrome plated component is a portion of a radiator grille or a fender vent. In some implementations, the radiator grille or the fender vent has a deep mesh configuration, and wherein the chrome plated component is a deep mesh portion of the radiator grille or the fender vent. In some implementations, the recess/protrusion feature is located one of (i) at a single point proximate to a center of an intersection of the mesh configuration and (ii) at multiple points proximate to corners of the intersection of the mesh configuration.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2A-2C are example views of a vehicle component having deep mesh plateable features according to some implementations of the present disclosure;

FIGS. 3A-3B are example cross-sectional views corresponding to FIGS. 2B-2C according to some implementations of the present disclosure.

DETAILED DESCRIPTION

As previously mentioned, creating plastic components for vehicles (e.g., radiator grilles and fender vents) having deep mesh chrome features can be difficult because of non-plateable material depth limitations due to tooling requirements (draft, thickness limitations, etc.). The term "deep mesh" as used herein refers to portions of a vehicle component (e.g., a radiator grille or a fender vent) comprising a mesh of a plated, plateable resin atop a non-plateable resin with apertures defined between portions of the mesh. While a radiator grille and a fender vent (e.g., exterior components) are explicitly recited herein as example chrome-plated vehicle components, it will be appreciated that any suitable vehicle components could be manufactured using the techniques disclosed herein (e.g., interior components).

Figure 1A:
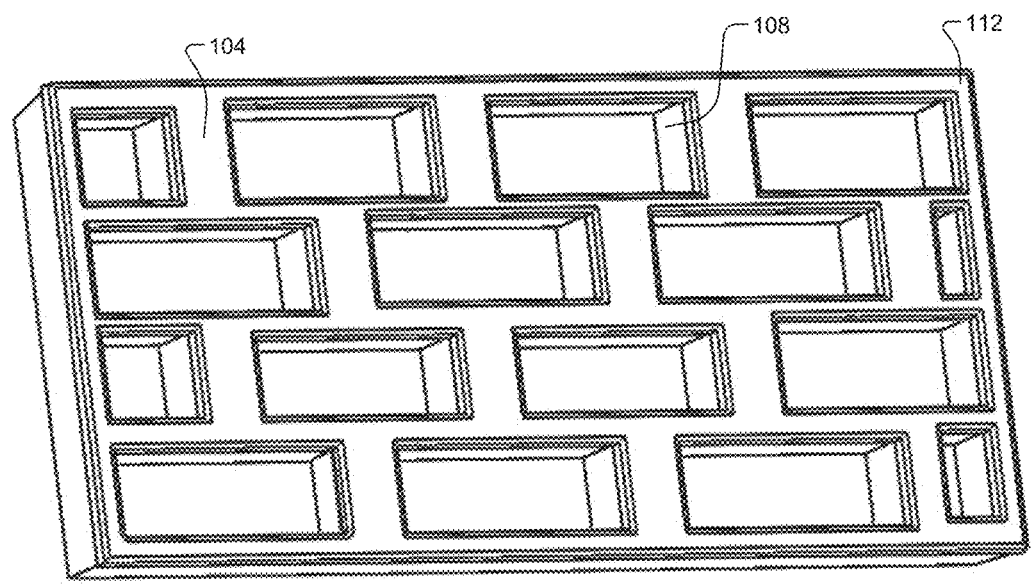
FIGS. 1A-1B are example front/rear views of a vehicle component having deep mesh plateable features according to some implementations of the present disclosure.
Figure 1B:
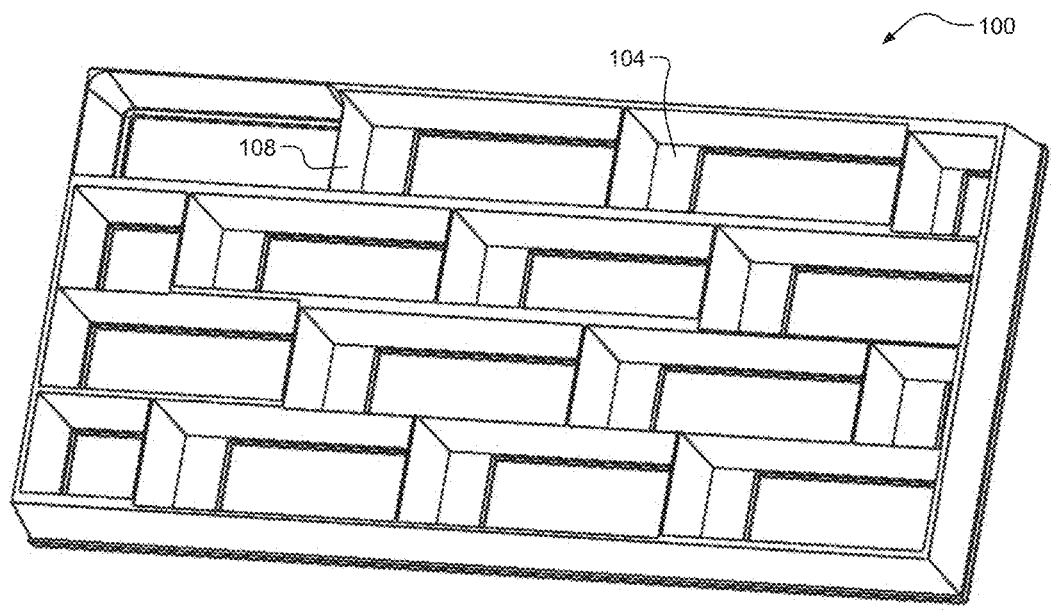

Portions of the non-plateable resin can have a larger maximum depth than other portions, which can give the appearance of a deep mesh design. FIGS. 1A-1B, for example, illustrate example front/rear views of a vehicle component 100 having deep mesh plateable features. As shown, the component 100 generally includes two portions: an upper/outer plateable portion 104 and a lower/inner non-plateable portion 108. The plateable portion 104 can further include an upper/outer edge portion 112 of the component 112 (e.g., for aesthetic purposes). Due to limitations of molding processes, there is a limit to the depth of the non-plateable portion 108. Such a deep mesh design can be difficult, however, because cosmetic defects (e.g., sink marks) can occur due to the large mass of non-plateable resin, particularly at the mesh intersections.

Accordingly, an improved vehicle component (e.g., a radiator grille) having deep mesh plated features and an improved method of manufacturing the chrome plated vehicle component are presented. The component can generally include a first member and a second member formed, for example, using a two-shot (2K) injection molding process. The first member can be molded from a non-plateable resin, such as a polycarbonate (PC), but it will be appreciated that any non-plateable resin could be used. The second member can be molded from a plateable resin, such as acrylonitrile butadiene styrene (ABS) or polycarbonate-ABS, but it will be appreciated that any plateable resin could be used. The first member can define a protrusion (e.g., excess plateable resin) and the second member can define a recess (e.g., less non-plateable resin), and the protrusion/recess can fit together such that the back/front surfaces of the first/second members are flush when joined to form an component. The front surface of the component (i.e., the front surface of the first member) can then be chrome plated and, due to the smaller mass of the non-plateable resin, a greater maximum depth of the second member can be achieved without affecting the quality of the chrome plating.

While the first member is described herein as being formed of non-plateable resin and the second member is described herein as being formed of plateable resin, it will be appreciated that these molding steps can occur in any order. For example, these members may be formed using a 2K molding process during which the plateable resin is first formed in a mold (a first shot) and then the non-plateable resin is subsequently formed in the mold (a second shot). Similarly, while the member formed of the plateable resin is described as defining a protrusion and the member formed of the non-plateable resin is described as defining a recess, these members may define the opposite configuration. More particularly, the member formed of the non-plateable resin may define a protrusion and the member formed of the plateable resin may define a recess. Such a configuration could be utilized, for example, to define deep chrome features as opposed to deep mesh (non-chrome) features. Such a configuration may also require a different mold than the other configuration.

Referring now to FIGS. 2A-2C, example views of a vehicle component 200 having deep mesh plateable features are illustrated. As shown, the deep mesh design can have a varying cross-section at different points. Reference 204 in FIG. 2B, for example, illustrates a thin bridge feature having a cross-section A-A. Reference 208 in FIG. 2C, on the other hand, illustrates a thicker mesh intersection feature having a cross-section B-B. As can be seen in FIGS. 3A-3B and as more fully described below, the thick mesh intersection feature 208 can have a larger mass than the thin bridge feature 204. Thus, the techniques of the present disclosure can be utilized at such mesh intersections to effectively remove a portion of the non-plateable resin and replace it with additional plateable resin. As shown, this can be performed either locally at multiple intersection points 212a and 212b or in at a larger single point 216 of the thicker intersection feature 204. Note that each of these points 212a, 212b, and 216 is offset to the left as this corresponds to the deep portion of the mesh feature. The local points 212a, 212b could, for example only, have different sizes depending on the widths of a proximate thin bridge feature 204. The result is the ability to create a deeper second member formed of the non-plateable resin, while still achieving the desired chrome plating on the first member formed of the plateable resin.

Referring now to FIGS. 3A-3B, example cross-sectional views A-A and B-B corresponding to FIGS. 2B and 2C, respectively, are illustrated. Cross-sectional view A-A is also referenced as 300. It will be appreciated that the illustrated/discussed dimensions are for example only and other dimensions could be implemented. As shown, a first member 304 is formed of a plateable resin ("P"). Example dimensions of the first member 304 are a base width of 4.1 millimeters (mm), a depth of 3.6 mm, and a draft angle of 5 degrees)(°. At a 4.0 mm or less depth (e.g., 3.6 mm) for the first member 304, there should not be an issue with sink marks. The second member 308 is formed of a non-plateable resin ("NP") and may define a smaller top width (e.g., 3.6 mm) than the bottom width of the first member 304 (i.e., the first member 304 may overhang the second member 308 by 0.25 mm on each side). The 0.25 mm dimension for the overhang is merely an example dimension and it will be appreciated that there could be an opposing overhang (i.e., the second member 308 may be wider than the first member 304) or the members 304, 308 could be substantially flush (i.e., no overhang). This overhang portion may also be part of the exposed surface of the first member 304 that is eventually chrome plated.

An example depth of the second member 308 is 12.7 mm at a draft angle of 5° and with a minimum width of 1.5 mm. While this depth may be achievable without the protrusion/recess feature 312, greater depths can be achieved because of the additional plateable resin 312. As can be seen, the shape of the protrusion/recess feature 312 generally corresponds to the shape of the second member 308. In some implementations, these may share a common draft angle (e.g., 5°). This can also be centered with respect to the widths of the first and second members 304, 308 as, from this view A-A, the center of mass of the component 200 is centered. In contrast, cross-sectional view B-B (also referenced as 350) corresponds to the mesh intersection feature 208, and the protrusion/recess feature 312 is off-center with respect to the widths of the first and second members 304, 308. At the mesh intersection, the first member 304 may define a width of 9.5 mm and the second member 308 may define a maximum upper width of 9 mm.

Figure 4:
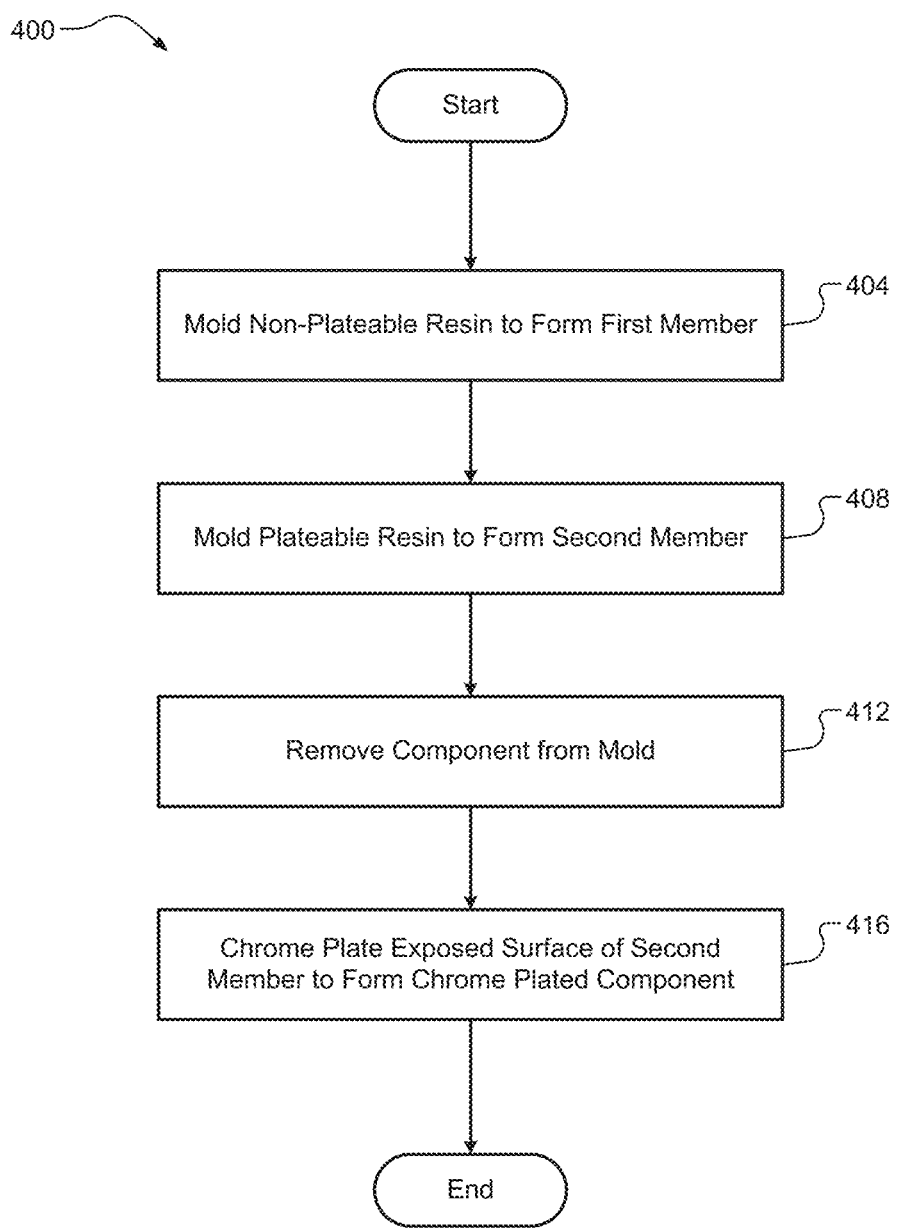
FIG. 4 is a flow diagram of an example method of manufacturing a chrome plated component for a vehicle according to some implementations of the present disclosure.

Referring now to FIG. 4, a method 400 of manufacturing a chrome plated vehicle component is illustrated. At 404, a non-plateable resin is molded in mold (a first shot of a 2K molding process) to form a first member defining a front surface that defines a recess. At 408, a plateable resin is molded in the mold (a second shot of the 2K molding process) to form a second member defining a front surface and a back surface, wherein the back surface defines a protrusion corresponding to the recess. At 412, a component is removed from the mold where (i) an exposed surface of the first member defines a front surface of the component, (ii) the recess receives the protrusion, and (iii) the front surface of the second member is flush with the back surface of the first member. At 416, a chrome plating process is performed to chrome plate the exposed surface of the second member (i.e., the plateable resin) to obtain the chrome plated component. The method 400 can then end or return to 404.

At least a portion of the techniques discussed herein could be implemented by a computing system, such as a computing device or controller having one or more processors and a non-transitory memory having a set of instructions stored thereon that, when executed by the one or more processors, causes the system to perform the operations of the present disclosure. Examples of such operations can include defining dimensions for a deep mesh radiator grille or fender vent, including maximum depths of the plateable and non-plateable resins and draft angles. Sizes (e.g., volumes) of the recesses and protrusions could then be calculated (e.g., using computer aided design (CAD) software) and mold(s) could be created for forming members having these features.

The computing system could also control machinery associated with the molds/molding and/or machinery associated with the chrome plating. After forming the members using these molds, the members could be joined together as described herein to form the deep mesh radiator grille, which could then be chrome plated on its front surface (i.e., the front surface of the member formed of the plateable resin). As described in greater detail above, this chrome plating process can be performed due to the reduced total mass of the member formed of the non-plateable resin/the increased mass of the member formed of the plateable resin.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a chrome plated component for a vehicle, the method comprising:
   performing a two-shot (2K) molding process to form a component comprising (i) first and second or (ii) third and fourth members, the 2K molding process comprising:
      performing a first shot by molding one of:
         (a) a non-plateable resin in a mold to form one of (i) the first member, the first member defining a front surface that defines a recess, and (ii) the third member, the third member defining a front surface that defines a protrusion corresponding to the recess; and
         (b) a plateable resin in the mold to form one of (i) the second member, the second member defining a back surface that defines the protrusion, and (ii) the fourth member, the fourth member defining a back surface that defines the recess;
      after performing the first shot, performing a second shot by molding the other of the non-plateable and plateable resins in the mold to form the other of (i) the first and second members or (ii) the third and fourth members, wherein draft angles of the recess and the protrusion correspond to a draft angle of the second or third member; and after performing the first and second shots, removing the component from the mold, where (i) an exposed surface of the second or fourth member defines a front surface of the component and (ii) the recess receives the protrusion such that the front surface of the first or third member is substantially flush with the back surface of the second or fourth member; and performing a chrome plating process to chrome plate the exposed surface of the second or fourth member to obtain the chrome plated component.

2. The method of claim 1, further comprising prior to molding (i) the first and second or (ii) third and fourth members, determining volumes of the recess and the protrusion based on a desired maximum depth of the first or third member.

3. The method of claim 2, wherein the first or third member defines a variable depth, and wherein the volumes of the recess and the protrusion are proportional to the maximum depth of the first or third member such that a larger recess and a larger protrusion correspond to a greater maximum depth of the first or third member.

4. The method of claim 3, wherein the recess is aligned with a portion of the first or third member that defines its maximum depth.

5. The method of claim 1, wherein the non-plateable resin is polycarbonate.

6. The method of claim 1, wherein the plateable resin is acrylonitrile butadiene styrene (ABS) or polycarbonate-ABS.

7. The method of claim 1, wherein the chrome plated component is a portion of a radiator grille.

8. The method of claim 1, wherein the chrome plated component is a fender vent.

9. A chrome plated component for a vehicle, the chrome plated component comprising:
  one of:
    (a) a first member formed of a non-plateable resin and defining a front surface that defines a recess and a second member formed of a plateable resin and defining a back surface that defines a protrusion corresponding to the recess, wherein the recess receives the protrusion such that the front surface of the first member is substantially flush with the back surface of the second member; and
    (b) a third member formed of the non-plateable resin and defining a front surface that defines the protrusion and a fourth member formed of the plateable resin and defining a back surface that defines the recess, wherein the recess receives the protrusion such that the front surface of the third member is substantially flush with the back surface of the fourth member,
  wherein the second or fourth member defines a variable depth, and wherein the recess is laterally aligned with a portion of the second or fourth member that defines its maximum depth; and
  a chrome plating on an exposed surface of the second or fourth member, wherein the chrome plated exposed surface of the second or fourth member defines a front surface of the chrome plated component.

10. The component of claim 9, wherein a draft of the recess corresponds to a draft of the second or fourth member.

11. The component of claim 9, wherein the second member defines a maximum depth less than or equal to 3.6 millimeters.

12. The component of claim 11, wherein the first member defines a maximum depth of greater than 12.7 millimeters.

13. The component of claim 12, wherein the first member defines a maximum depth of approximately 20 millimeters.

14. The component of claim 9, wherein the non-plateable resin is polycarbonate.

15. The component of claim 9, wherein the plateable resin is acrylonitrile butadiene styrene (ABS) or polycarbonate-ABS.

16. The component of claim 9, wherein the chrome plated component is a portion of a radiator grille or a fender vent.

17. The component of claim 16, wherein the radiator grille or the fender vent has a deep mesh configuration, and wherein the chrome plated component is a deep mesh portion of the radiator grille or the fender vent.

18. The component of claim 17, wherein the recess/protrusion feature is located one of (i) at a single point proximate to a center of an intersection of the mesh configuration and (ii) at multiple points proximate to corners of the intersection of the mesh configuration.

19. A method of manufacturing a chrome plated component for a vehicle, the method comprising:
  performing a multi-shot molding process to form a component comprising (i) first and second or (ii) third and fourth members, the multi-shot molding process comprising:
    performing a first shot by molding one of:
      (a) a non-plateable resin in a mold to form one of (i) the first member, the first member defining a front surface that defines a recess, and (ii) the third member, the third member defining a front surface that defines a protrusion corresponding to the recess; and
      (b) a plateable resin in the mold to form one of (i) the second member, the second member defining a back surface that defines the protrusion, and (ii) the fourth member, the fourth member defining a back surface that defines the recess;
    prior to molding (i) the first and second or (ii) third and fourth members, determining volumes of the recess and the protrusion based on a desired maximum depth of the first or third member, wherein the first or third member defines a variable depth, and wherein the volumes of the recess and the protrusion are proportional to the maximum depth of the first or third member such that a larger recess and a larger protrusion correspond to a greater maximum depth of the first or third member;
    after performing the first shot, performing a second shot by molding the other of the non-plateable and plateable resins in the mold to form the other of (i) the first and second members or (ii) the third and fourth members; and
    after performing the first and second shots, removing the component from the mold, where (i) an exposed surface of the second or fourth member defines a front surface of the component and (ii) the recess receives the protrusion such that the front surface of the first or third member is substantially flush with the back surface of the second or fourth member; and performing a chrome plating process to chrome plate the exposed surface of the second or fourth member to obtain the chrome plated component.

20. The method of claim 19, wherein the recess is aligned with a portion of the first or third member that defines its maximum depth.

* * * * *